Oct. 22, 1929.   S. C. BLOOM ET AL   1,732,802
SEPARABLE ICE CAKE AND PROCESS OF MAKING THE SAME
Filed Nov. 16, 1928

Inventor,
Samuel C. Bloom
and Willis H. Carrier,
By Dyrenforth, Lee, Chritton & Wiles,
Attys.

Patented Oct. 22, 1929

1,732,802

UNITED STATES PATENT OFFICE

SAMUEL C. BLOOM, OF CHICAGO, ILLINOIS, AND WILLIS H. CARRIER, OF ESSEX FELLS, NEW JERSEY

SEPARABLE ICE CAKE AND PROCESS OF MAKING THE SAME

Application filed November 16, 1928. Serial No. 319,810.

This invention relates to improvements in separable ice cakes and process of making the same; and more especially to such an ice cake made up of small cubes.

There is a great demand, especially in connection with domestic uses, for ice in small cubes. In this form it is well adapted for use in the kitchen and on the table, and is easily handled.

One of the features of our invention is the provision of an ice cake made up of such small cubes and capable of being readily separated. The larger cake with the cubes together can be more easily transported from an ice plant to the home of the consumer than an equivalent number of separated small cubes. Also, as long as the small cubes are fastened together in a large cake, the loss by melting is considerably reduced. When so fastened together in a large cake there is a relatively smaller amount of surface exposed to the atmosphere than if the individual cubes were separated. Such a large cake with the cubes joined together is also easier to keep in a refrigerator as the space required is considerably less than in the case of separated cubes.

As stated before, however, it is desirable to have the smaller cubes for use in the kitchen and on the table. Our invention contemplates, therefore, the making of a large cake composed of smaller cubes fastened together which can be transported and delivered to the consumer. The consumer can keep this cake in a refrigerator or elsewhere. When the ice is required for use, the cake can be easily separated or divided into smaller pieces by cracking it through the natural planes of cleavage between adjoining cubes.

Other features and advantages of our invention will appear more fully as we proceed with our specification.

Figure 1:
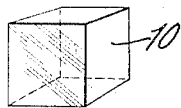
Figure 2:
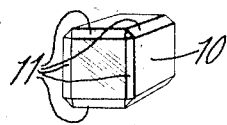
Figure 3:
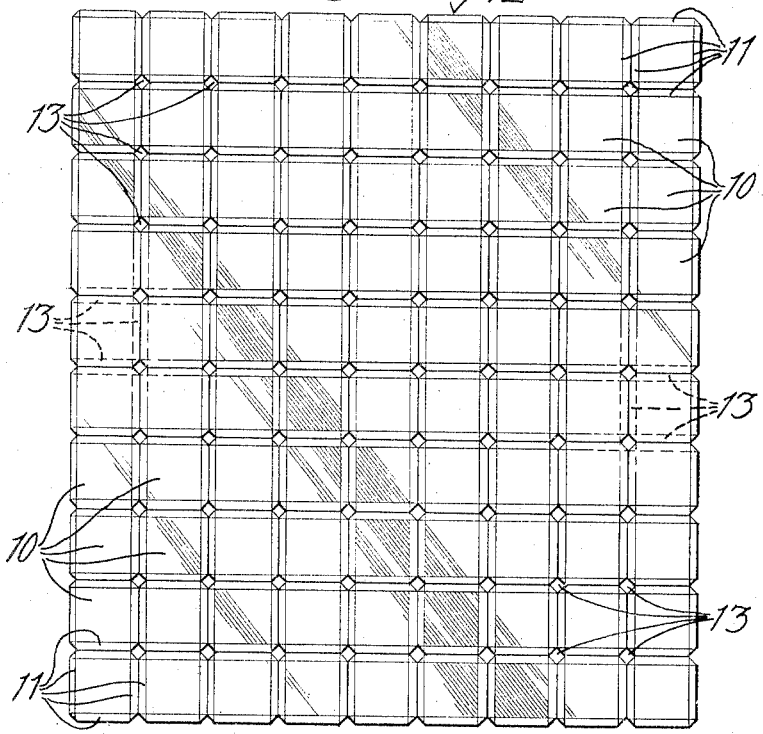
Figure 4:
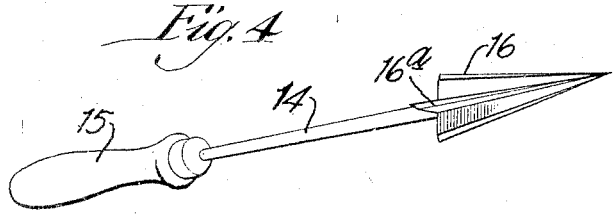
Figure 5:
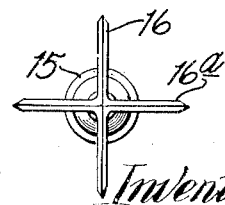

In that form of device embodying the features of our invention shown in the accompanying drawings, Figure 1 is a perspective view of a small cube of ice showing the first step in the manufacture of the larger separable cake, Fig. 2 is the same cube after the edges thereof have been chamfered, Fig. 3 is a view in side elevation of the completed cake, Fig. 4 is a view in perspective of the ice pick or tool that may be used to assist in separating the cake into its integral cubes, and Fig. 5 is a bottom plan view of the pick on an enlarged scale.

As shown in the drawings, 10 indicates a small cube of ice which can be frozen artificially, cut from larger pieces, or made in any desired way. A sufficient number of these small cubes are made to form a completed cake of the desired size. The edges of these cubes are then chamfered as indicated by 11. We suggest that all twelve edges be so chamfered; but possibly satisfactory results may be obtained by chamfering a fewer number.

The small cubes are then placed together to form a large cake 12 and pressure applied so that they cohere by regelation. The union or fusion of the smaller cubes by regelation may be somewhat incomplete so that, to a certain extent, natural planes of cleavage exist between adjacent cubes.

The chamfered edges of the smaller cubes 10 produce intersecting square holes at right angles to each other through the cake as indicated by 13, 13.

The large cake may be readily divided or separated into smaller pieces, as many of such small cubes being broken from the large cake at one time as desired. The process of separating the cake into the cubes may be assisted by the use of an ice pick as illustrated in Figs. 4 and 5. This pick comprises a shank 14 with a handle 15 and provided with two pointed blades 16 and 16ª bisecting each other at right angles on their horizontal axes. In the use of the pick, the point is preferably forced into one of the holes 13 so that the edges of the blades are forced between adjacent faces of adjoining cubes to separate the same.

While we have shown and described certain embodiments of our invention, it is to be understood that it is capable of many modifications. Changes, therefore, in the construction and arrangement may be made without departing from the spirit and scope of the invention disclosed in the appended claims, in which it is our intention to claim all novelty in our invention as broadly as permissible in view of the prior art.

What we claim is new, and desire to secure by Letters Patent, is:

1. The process of making a separable ice cake consisting of, first forming small cubes, then chamfering off one or more of the edges of one or more of said cubes, and then joining said cubes together by regelation to form a cake.

2. The process of making a separable ice cake consisting of, first forming small cubes, then chamfering off the edges of said cubes, and then joining said cubes together by regelation to form a cake.

3. A separable ice cake formed of small cubes with chamfered edges joined together with natural planes of cleavage between adjacent faces of adjoining cubes.

4. A separable ice cake formed of small cubes with chamfered edges joined together by regelation to form a cake.

5. A separable ice cake having intersecting holes therethrough at right angles to each other between opposite faces, to permit cracking of said cake on planes intersecting said holes to separate the cake into small cubes.

6. A separable ice cake having intersecting holes therethrough at right angles to each other between opposite faces, said holes being arranged in rows lying in parallel equally spaced planes, whereby said cake may be cracked through said planes to separate the same into small cubes.

In witness whereof, we have hereunto set our hands this 1st day of November, 1928, and this 8th day of November, 1928.

SAMUEL C. BLOOM.
WILLIS H. CARRIER.